(12) United States Patent
Zeng et al.

(10) Patent No.: US 7,692,937 B2
(45) Date of Patent: Apr. 6, 2010

(54) RESONANT CONVERTER AND VOLTAGE STABILIZING METHOD THEREOF

(75) Inventors: Jian-Hong Zeng, Shanghai (CN); Yi-Qing Ye, Shanghai (CN); Chao Yan, Shanghai (CN); Jian-Ping Ying, Shanghai (CN); Guo-Dong Yin, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 290 days.

(21) Appl. No.: 11/748,241

(22) Filed: May 14, 2007

(65) Prior Publication Data
US 2007/0285952 A1    Dec. 13, 2007

(30) Foreign Application Priority Data
Jun. 9, 2006    (TW)    ............... 95120716 A

(51) Int. Cl.
*H02M 3/335*    (2006.01)
(52) U.S. Cl. .................... 363/17; 363/21.02
(58) Field of Classification Search ... 363/21.01–21.03, 363/16–18, 49
See application file for complete search history.

(56) References Cited

U.S. PATENT DOCUMENTS

| 5,345,374 A * | 9/1994 | Sato et al. ............ 363/24 |
| 5,388,040 A | 2/1995 | Hall |
| 5,430,633 A * | 7/1995 | Smith ............ 363/20 |
| 5,598,326 A * | 1/1997 | Liu et al. ............ 363/34 |
| 6,018,467 A * | 1/2000 | Majid et al. ............ 363/16 |
| 6,295,213 B1 * | 9/2001 | Smith ............ 363/21.01 |
| 2003/0142513 A1 * | 7/2003 | Vinciarelli ............ 363/17 |

FOREIGN PATENT DOCUMENTS

| JP | 02-106164 A | 4/1990 |
| JP | 08-033329 A | 2/1996 |

* cited by examiner

*Primary Examiner*—Bao Q Vu
*Assistant Examiner*—Jue Zhang
(74) *Attorney, Agent, or Firm*—Volpe and Koenig, P.C.

(57) ABSTRACT

A resonant converter and voltage stabilizing method thereof are provided. The resonant converter includes a converting stage circuit, a diode-rectifying stage circuit, a filter and load stage circuit, a logic circuit, a driving circuit, and an energy-recycling circuit. The method includes steps of recycling an energy from the filter and load stage circuit to the converting stage circuit when the resonant converter is light- or zero-loaded.

16 Claims, 16 Drawing Sheets

40

RESONANT CONVERTER AND VOLTAGE STABILIZING METHOD THEREOF

FIELD OF THE INVENTION

The present invention relates to a resonant converter and a voltage stabilizing method for the resonant converter operating at light load or no load condition, and more particularly to a resonant dc/dc converter for a power supply.

BACKGROUND OF THE INVENTION

Recently, more and more strict demands are asked on the DC/DC converter such as high efficiency, high power density, high reliability and low cost. Please refer to FIG. 1, which is a block diagram showing a dc/dc converter according to the prior art. In FIG. 1, the dc/dc converter 10 includes a converting stage circuit 11, a diode-rectifying stage circuit 12, and a filter and load stage circuit 13. The operation principle of the dc/dc converter 10 includes the steps of: a dc voltage Vin is firstly modulated by the converting stage circuit 11, then rectified by the diode-rectifying stage circuit 12, and finally filtered by the filter and load stage circuit 13 to be sent to a load (not shown).

In the dc/dc converter 10, the energy is delivered from the converting stage circuit 11 to the filter and load stage circuit 13, which is a uni-direction path. And sometimes this "uni-directional path" energy transferring method will cause the output voltage of the dc/dc converter 10 unstable when operating at light or no load condition, as shown in FIG. 2(a).

Please refer to FIG. 2(a), which is a circuit diagram showing a full-bridge LLC converter according to the prior art. The full-bridge LLC converter is generally operated using Pulse Frequency Modulation (PFM) technique. In FIG. 2(a), the full-bridge LLC converter 20 includes a converting stage circuit, a diode-rectifying stage circuit, and a filter and load stage circuit. The converting stage circuit includes four switches Q1~Q4, a resonant capacitor C1, a resonant inductor L1, a magnetizing inductor L2, and a transformer T1. The diode-rectifying stage circuit includes two diodes D1~D2. The filter and load stage circuit includes a filter capacitor Cout. The switches Q1 and Q2 constitute one bridge arm and the switches Q3 and Q4 constitute the other. The respective driving signal of the switches Q1 and Q4 and the switches Q2 and Q3 drives the switches at nearly 50% duty cycle. Between the midpoint of the two bridge arms are the resonant capacitor C1, the resonant inductor L1, and the primary side of the transformer T1, which are connected in series. The secondary side of the transformer T1, which is a center-tap structure, includes two diodes D1 and D2 to form a full-wave rectifier. The output side of the full-bridge LLC converter 20 includes a capacitor Cout for filtering and stabilizing the output voltage.

For a resonant converter with the diode rectifying technique, there exists a minimum voltage gain in the range of the operation frequency thereof, for example, the minimum voltage gain obtained when the above full-bridge LLC converter 20 is operated at the highest operation frequency. Generally, a converter is designed to have its gain more than the above minimum voltage gain when operating in the range of the operation frequency thereof, and the converter is theoretically able to be operated stably with complete zero load. In practice, due to the parasitic oscillation generated by the parasitic parameters of the elements, e.g. the parasitic capacitor at the primary or secondary side of the transformer, an excess of energy will be injected into the output terminal so as to cause the output voltage to rise when using the diode-rectification at the secondary side, as shown in FIG. 2(a). Thus, the converter will be unstable when operating at light or no load condition.

To solve the aforementioned problems, there are at least four technical schemes in the prior art, which are provided as follows.

The first is to consume the excess energy injected into the output terminal. The practical method is to install an adequate dummy load. However, the dummy load will cause the converter to be operated in a lower efficiency and consume more power when operating at no load condition. Besides, the size and the cost are also increased, too.

The second is to install an independent auxiliary circuit. When operating at light or zero load condition, the main circuit is switched off and the auxiliary circuit is operated to maintain the output voltage. In this regard, there will be no additional loss at normal load. However, it needs load judgment additionally and switching between the auxiliary circuit and the main circuit, which increases the control complexity and adds the additional requirements on the dynamic performance of the converter.

The third is to adopt burst mode control technique to reduce the energy transferred from the input terminal to the output terminal when operating at light load or no load condition.

The fourth is to prevent the excess energy from being injected into the output terminal when operating at light load or no load condition, which is realized by changing the resonant parameters or the resonant impedance. There are at least three methods as follows:

(1) U.S. Pat. No. 5,388,040

Please refer to FIG. 2(b), which is a circuit diagram showing the full-bridge LLC converter provided in U.S. Pat. No. 5,388,040. In the full-bridge LLC converter 21, the elements which are the same as those in FIG. 2(a) are marked with the same numerical symbols.

The technical scheme adopted in U.S. Pat. No. 5,388,040 is to change the resonant parameters according to the load conditions. As FIG. 2(b) shows, a switch Sa is introduced into the main circuit to be connected with the magnetizing inductor L2 in series. The equivalent magnetizing inductance is able to be adjusted by controlling the switch Sa. When operating at light or no load condition, the equivalent magnetizing inductance of the main circuit will be decreased after the switch Sa is turned on. Therefore, the minimum voltage gain of the main circuit will also be decreased in a specific range of operation frequency. Thus the main circuit will be operated stably.

(2) JP Patent No. 8,033,329

Please refer to FIG. 2(c), which is a circuit diagram showing the full-bridge LLC converter provided in JP Patent No. 8,033,329. In the full-bridge LLC converter 22, the elements, which are the same as those in FIG. 2(a) are marked with the same numerical symbols.

The technical scheme adopted in JP Patent No. 8,033,329 is to change the resonant impedance at different load conditions. As FIG. 2(c) shows, a parallel resonant unit composed of an inductor L2 and a capacitor C2 is in the resonant loop constituted by the resonant capacitor C1, the resonant inductor L1, and the primary side of the transformer T1, so as to increase the impedance of the resonant loop when the converter 22 is light- or zero-loaded. Thus the whole system will be operated stably accordingly. However, the drawback is that the parallel resonant unit will bear a large voltage current stress when the main circuit is light- or zero-loaded.

(3) JP Patent No. 2,106,164

Please refer to FIG. 2(d), which shows the full-bridge LLC converter provided in JP Patent No. 2,106,164. In the full-bridge LLC converter 23, the elements, which are the same as those in FIG. 2(a) are marked with the same numerical symbols.

As FIG. 2(d) shows, a series circuit composed of an auxiliary switch S and a resistor R is connected to the resonant capacitor C1 in parallel. With the series circuit, the energy at the resonant capacitor C1 will be consumed when operating at zero load condition, in order to prevent the excess of energy from being injected into the output terminal.

SUMMARY OF THE INVENTION

It is therefore an object of the present invention to provide a resonant converter and a voltage stabilizing method thereof, so that the drawback that the converter being operated unstably when operating at light or zero load condition resulting from the parasitic parameters, can be eliminated.

According to the foregoing object of the present invention, a resonant converter is provided. The resonant converter includes additionally an energy-recycling circuit. The energy-recycling circuit is able to recycle the excess of energy, from the output terminal of the converter, to the input terminal of the converter.

According to the foregoing object of the present invention, a voltage stabilizing method for a resonant converter with light or open load is provided. With the method, the energy will be recycled from the output terminal of the converter to the input terminal of the converter through a substantial circuit or an inducting circuit, so that the stable operation of the converter when operating at light load or zero load condition is achieved.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
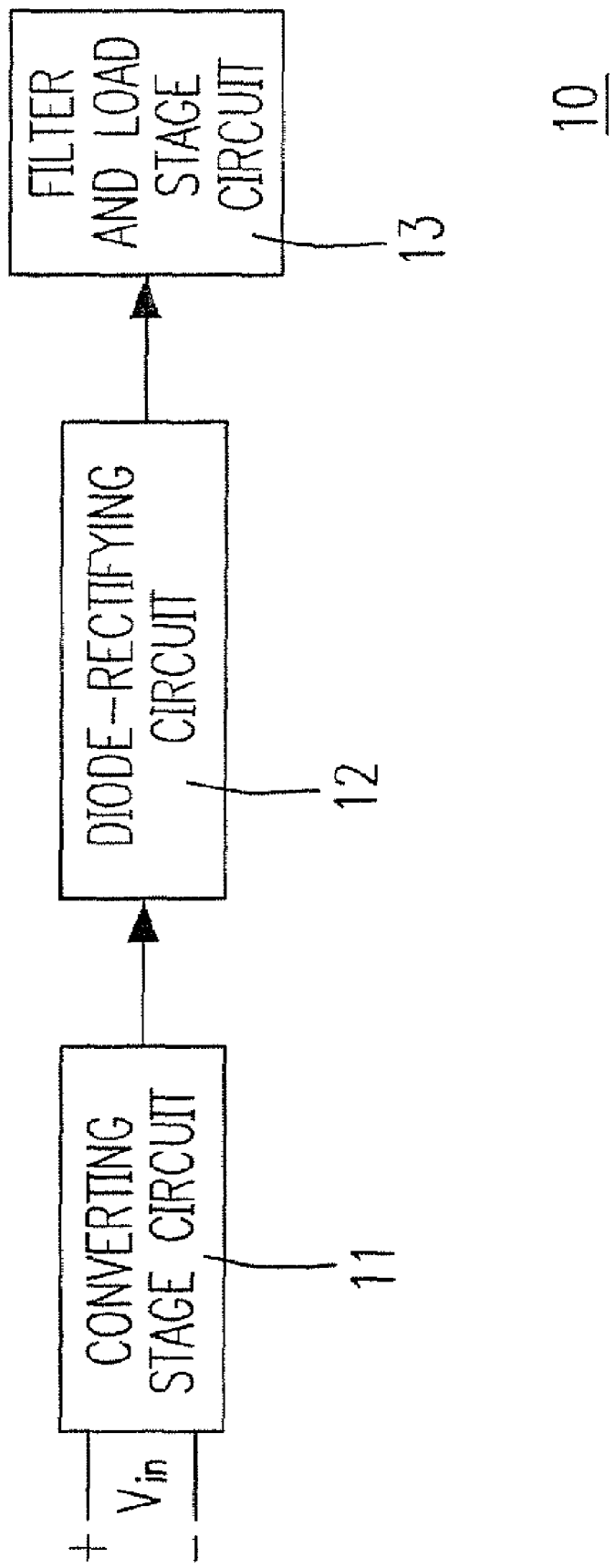
FIG. 1 is a block diagram showing a dc/dc converter according to the prior art.
Figure 2A:
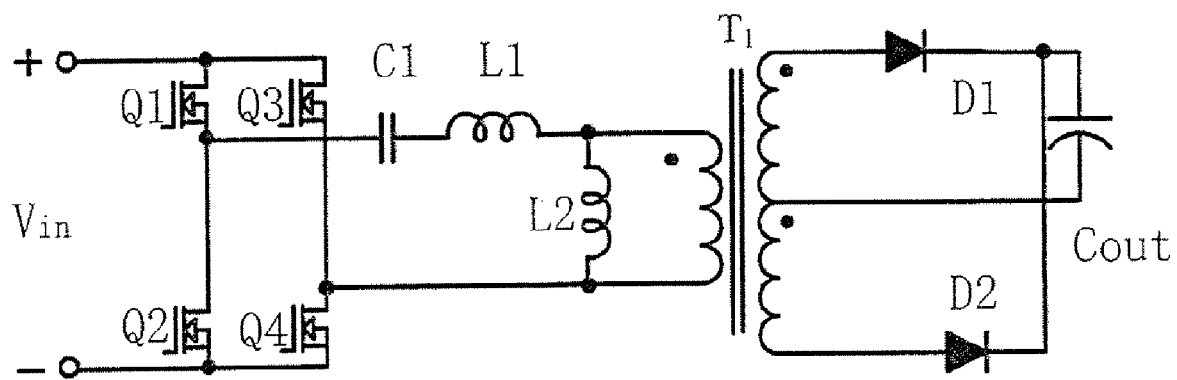
FIG. 2(a) is a circuit diagram showing a full-bridge LLC converter according to the prior art.
Figure 2B:
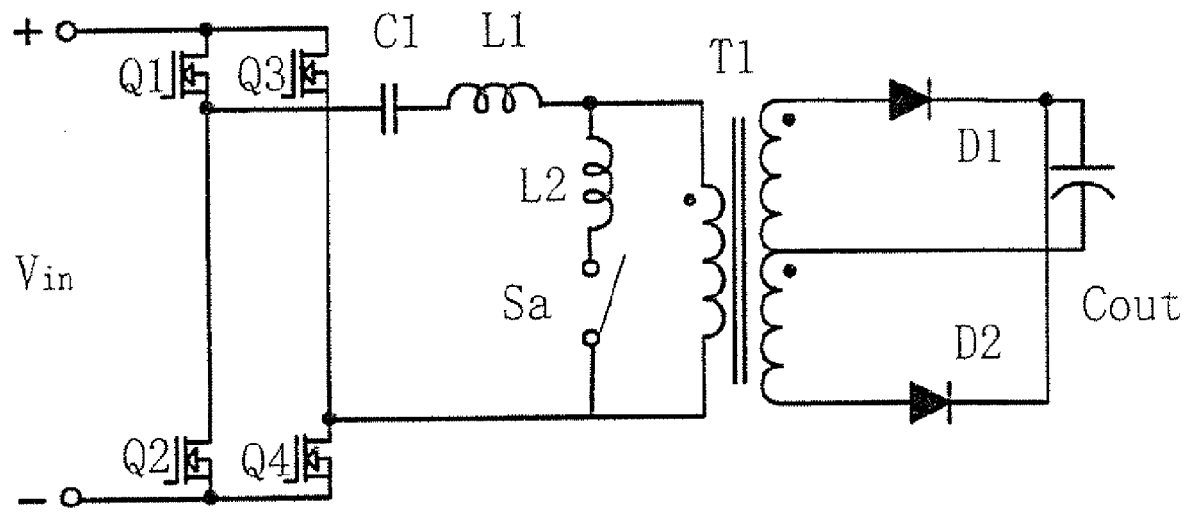
FIG. 2(b) is a circuit diagram showing the full-bridge LLC converter provided in U.S. Pat. No. 5,388,040.
Figure 2C:
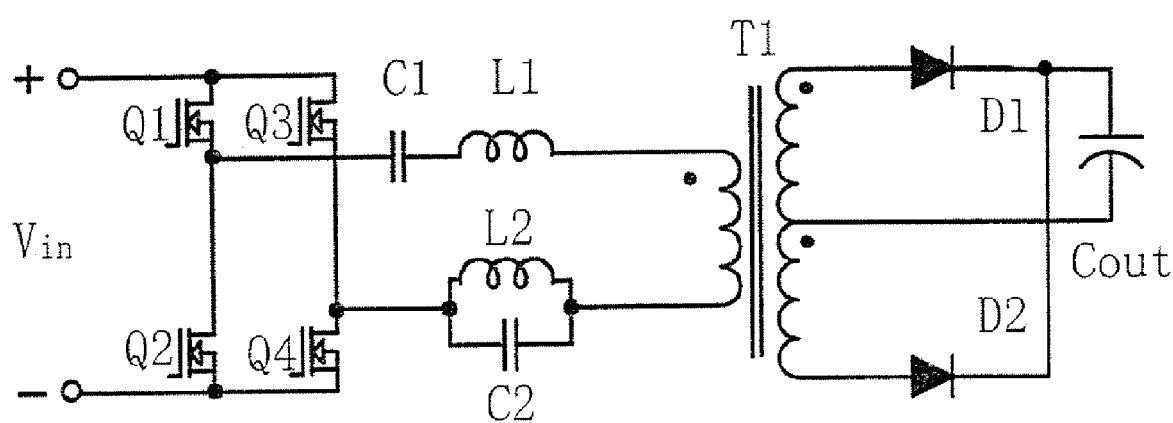
FIG. 2(c) is a circuit diagram showing the full-bridge LLC converter provided in JP Patent No. 8,033,329.
Figure 2D:
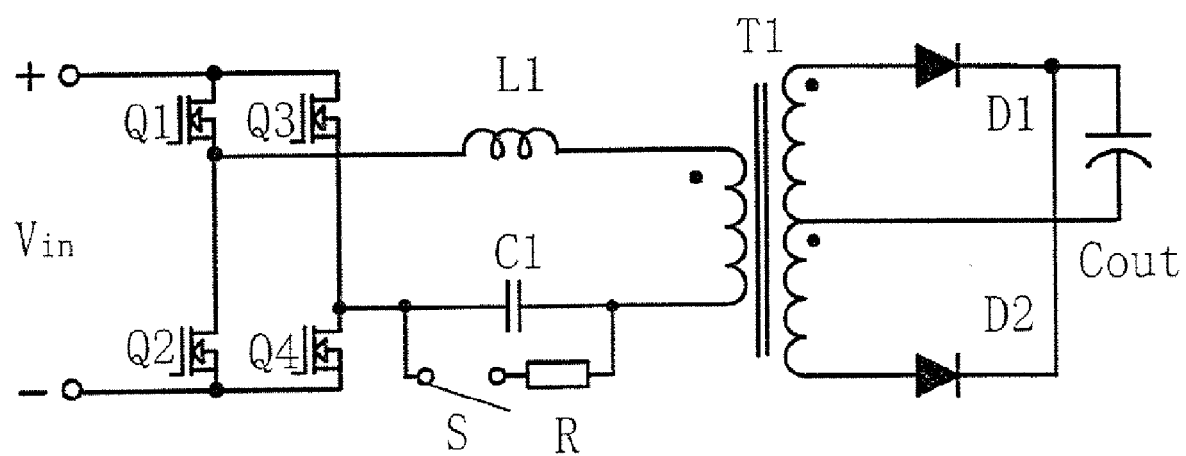
FIG. 2(d) is a circuit diagram showing the full-bridge LLC converter provided in JP Patent No. 2,106,164.
Figure 3:
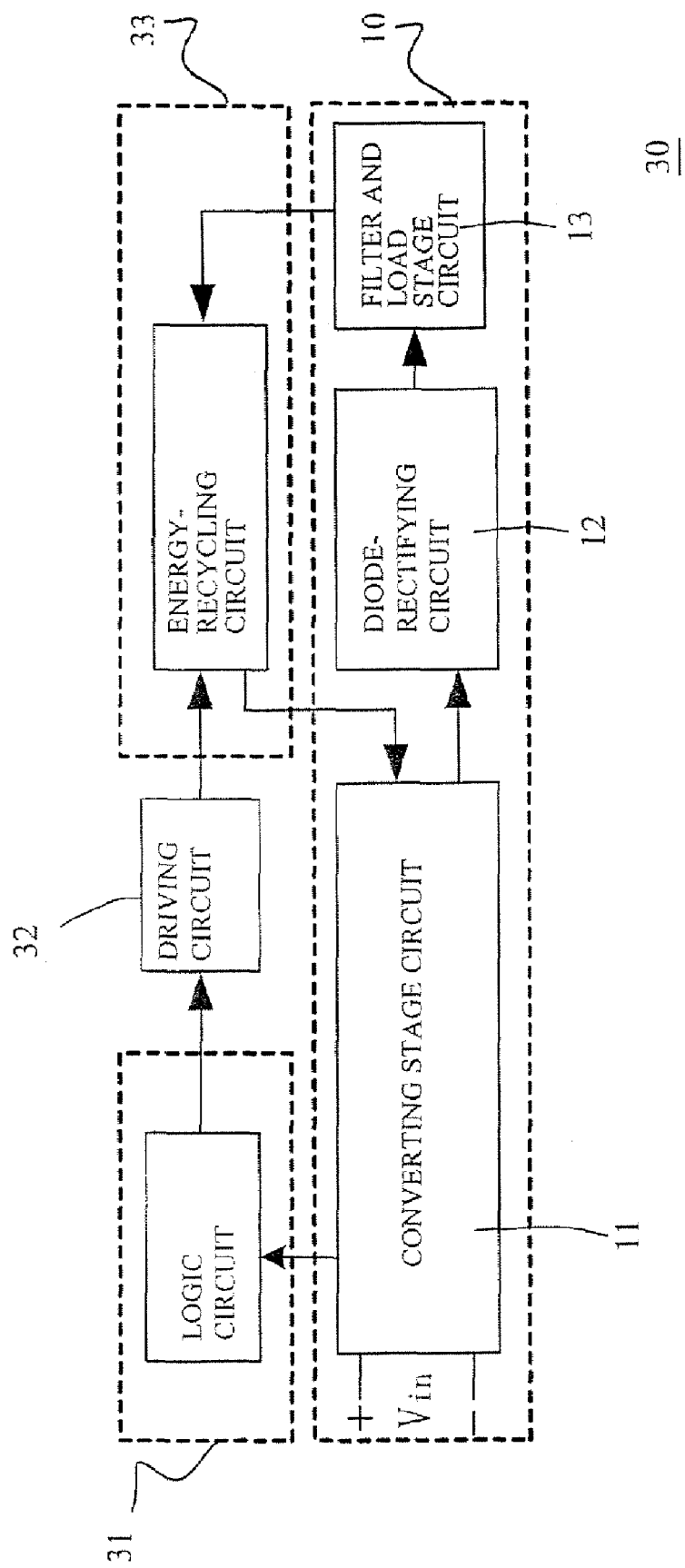
FIG. 3 is a circuit diagram showing a converter according to one preferred embodiment of the present invention.

Please refer to FIG. 3, which is a block diagram showing a converter according to one preferred embodiment of the present invention. In the converter 30, the blocks, which are the same as those in FIG. 1 are marked with the same numerical symbols. The converter 30 includes a converting stage circuit 11, a diode-rectifying stage circuit 12, a filter and load stage circuit 13, a logic circuit 31, a driving circuit 32, and an energy-recycling circuit 33.

The diode-rectifying stage circuit 12 is connected with the converting stage circuit 11 in series to rectify the output thereof. The filter and load stage circuit 13 is connected with the diode-rectifying stage circuit 12 in series to filter the output thereof. The logic circuit 31 is coupled with the converting stage circuit 11 to generate a logic signal in response thereto. The driving circuit 32 is coupled with the logic circuit 31 in series to generate a driving signal in response thereto. The energy-recycling circuit 33 is coupled with the converting stage circuit 11, the filter and load stage circuit 13, and the driving circuit 32. When the converter 30 is operating at light load or no load condition, the energy-recycling circuit 33 will recycle the energy from the filter and load stage circuit 13 back to the converting stage circuit 11 in response to the driving signal.

Figure 4:
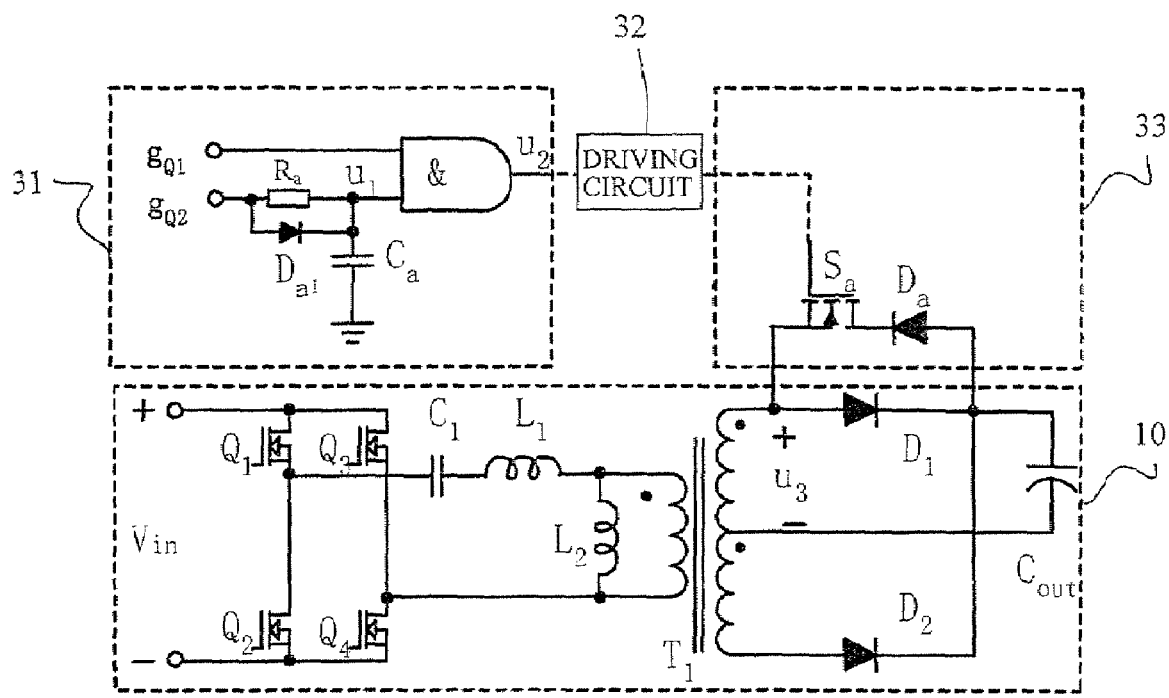
FIG. 4 is a circuit diagram showing a converter according to one preferred embodiment of the present invention.
Figure 5A:
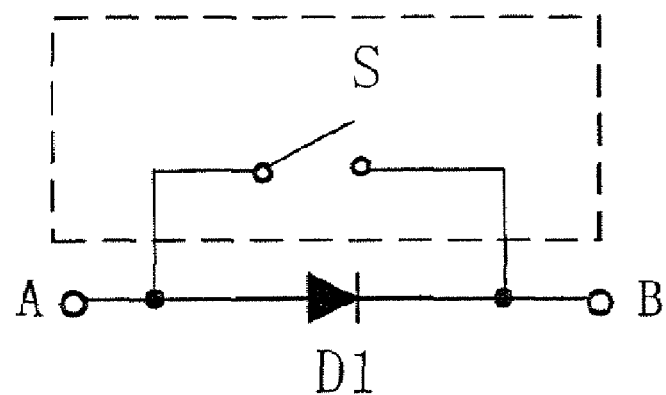
FIG. 5(a)~(f) are circuit diagrams showing the variations of the energy-recycling circuit according to the present invention.
Figure 5B:
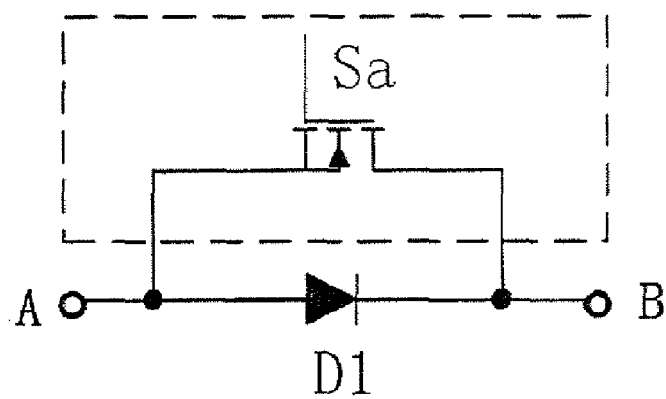
Figure 5C:
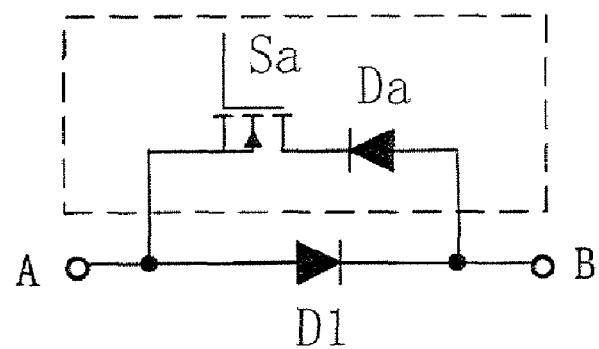
Figure 5D:
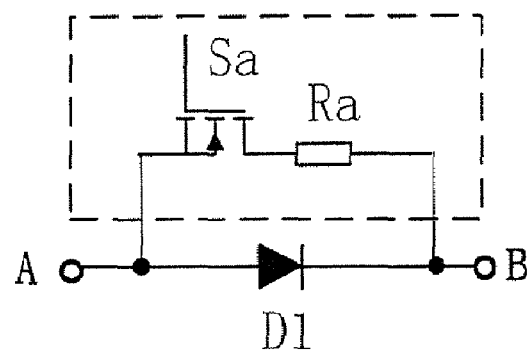
Figure 5E:
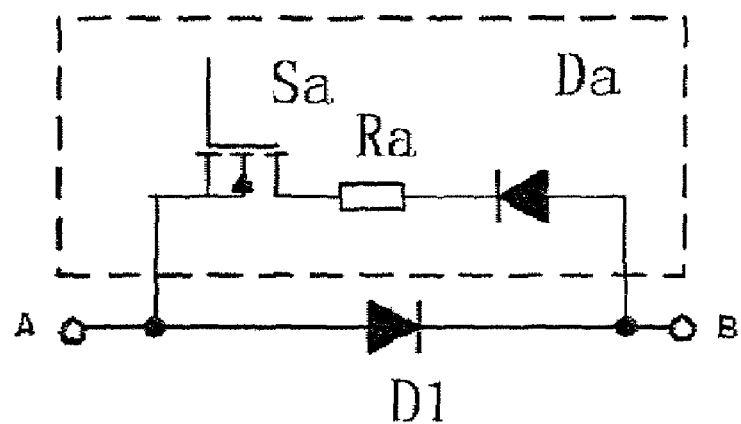
Figure 5F:
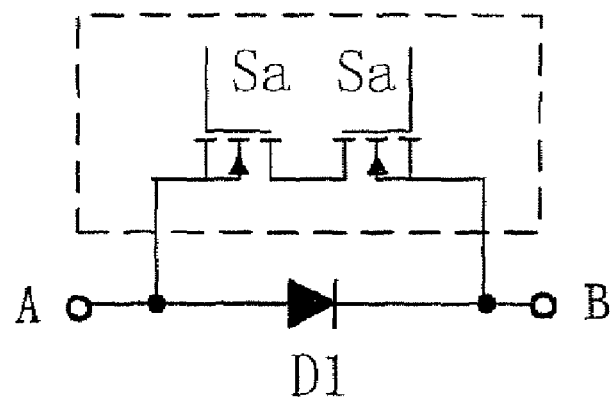

Please refer to FIG. 4, which is a circuit diagram showing a converter according to one preferred embodiment of the present invention. In the converter 40, the blocks, which are the same as those in FIG. 3 are marked with the same numerical symbols. The resonant converter 40 is a series resonant converter, which includes a dc/dc converter 10, a logic circuit 31, a driving circuit 32, and an energy-recycling circuit 33.

In FIG. 4, the converting stage circuit includes an input-voltage generating circuit composed of four switches Q1~Q4, a resonant capacitor C1, resonant inductor L1, a magnetizing inductor L2, and a transformer T1. The magnetizing inductor L2 is firstly connected with the primary side of the transformer T1 in parallel and then connected with the resonant circuit in series. Although the four switches Q1~Q4 are adopted to constitute a full-bridge circuit as the input-voltage generating circuit in the preferred embodiment, two switches are also able to be adopted to constitute a half-bridge circuit as the input-voltage generating circuit alternatively.

In FIG. 4, the diode-rectifying stage circuit and the filter and load stage circuit are sequentially coupled to the secondary side of the transformer T1. Although the two diodes D1~D2 are adopted to constitute a diode fall-wave rectifying circuit as the diode-rectifying stage circuit, the diode full-wave rectifying circuit is also able to be replaced with a diode half-wave rectifying circuit or a diode full-bridge rectifying circuit. The filter and load stage circuit includes a capacitor Cout while the load is not shown in FIG. 4.

Although the logic circuit 31 in FIG. 4 is composed of a resistor Ra, a diode Da1, a capacitor Ca, and an AND logic gate, the practical circuit is not limited thereto. One skilled in the art is able to figure out other types of circuit as the logic circuit 31 providing the similar circuit functions.

Although the energy-recycling circuit 33 in FIG. 4 is composed of a switch Sa and a diode Da, the practical circuit is not limited thereto. One skilled in the art is able to figure out other types of circuit as the energy-recycling circuit 33 providing the similar circuit functions. In the present invention, the energy-recycling circuit 33 includes at least a switch. In this regard, the energy-recycling circuit 33 could be composed of the single switch shown in FIG. 5(a), the single transistor switch Sa shown in FIG. 5(b), the series connection of the single switch Sa and the diode Da shown in FIG. 5(c), the series connection of the single switch Sa and the resistor Ra shown in FIG. 5(d), the series connection of the single switch Sa, the resistor Ra and the diode Da shown in FIG. 5(e), or the series connection of the two switches Sa shown in FIG. 5(f). Provided that the energy is able to be recycled from the output terminal to the input terminal, the energy-recycling circuit 33 could be composed of one or more switches. Each of the switches could be a uni-directional switch or a bi-directional switch. The switches could be connected with an outer resistor in series, as long as the switches are able to provide a controllable energy channel from point B to point A, as shown in FIG. 5.

Figure 6A:
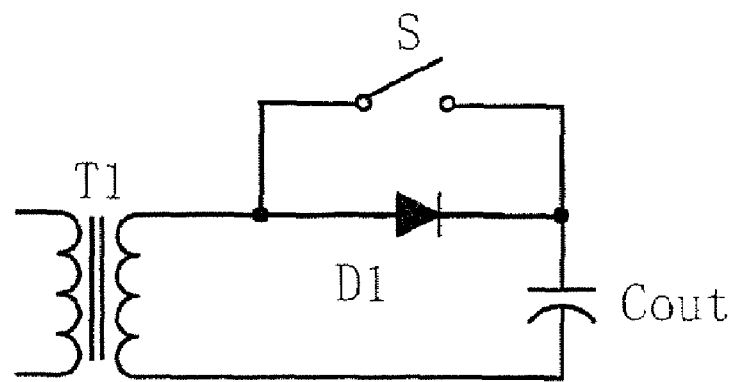
FIG. 6(a)~(e) are circuit diagrams showing the variations of the connection formed by the energy-recycling circuit and the diode-rectifying stage circuit according to the present invention.
Figure 6B:
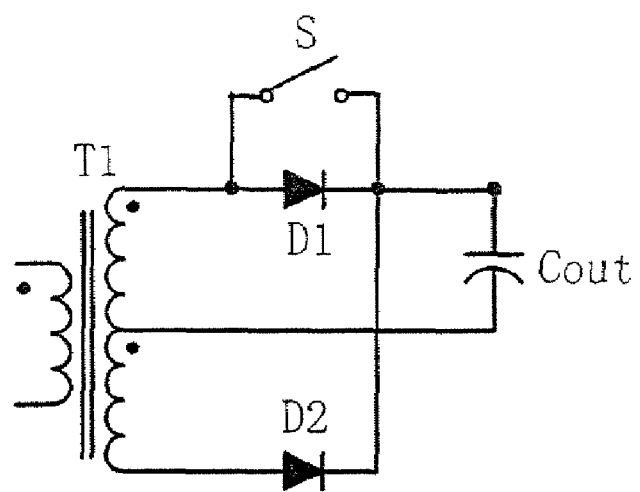
Figure 6C:
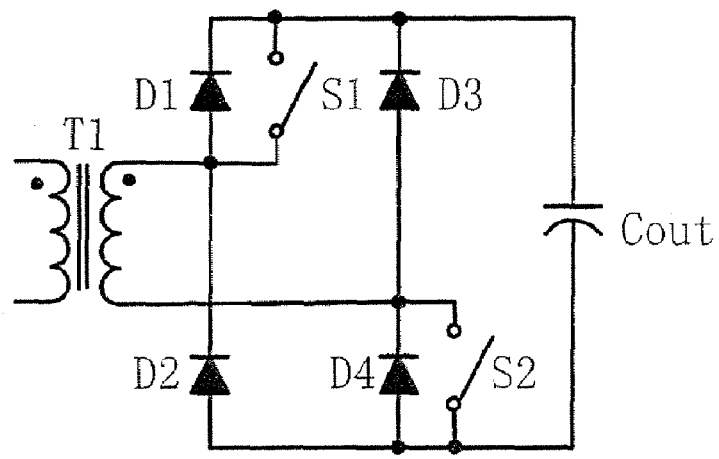
Figure 6D:
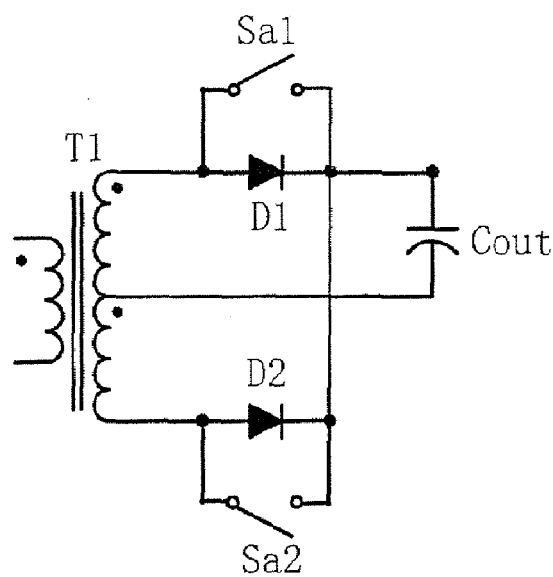
Figure 6E:
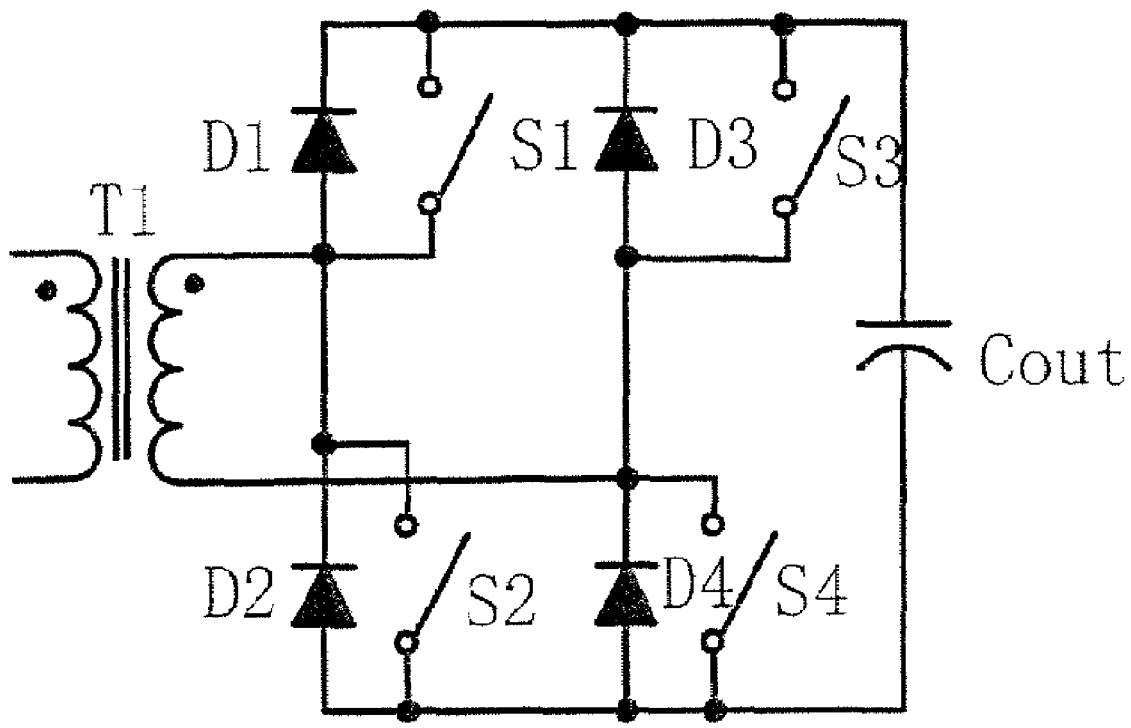

As mentioned above, the diode rectifying stage circuit could be a diode half-wave rectifying circuit, a diode fall-wave rectifying circuit or a diode full-bridge rectifing circuit. FIG. 6(a)~(c) are circuit diagrams showing the connection of the energy-recycling circuit of FIG. 5(a) and the respective three diode rectifying stage circuits. As FIG. 6(a)~(c) show, the energy-recycling circuit is a single substantial circuit. The energy-recycling frequency of is at most equal to the switch frequency of the converting stage circuit, which means that the recycle of the energy from the output terminal to the input terminal can be achieved at most once during a switch cycle. Certainly, the recycle of the energy could also be achieved once during several switch cycles. In the respective FIG. 6(d) and FIG. 6(e), two substantial circuits are provided and each diode of the diode rectifying stage circuit is connected with a switch in parallel. With the additional energy-recycling unit (the switch), the energy recycle could also be achieved at most twice during a switch cycle.

The operation principles shown in FIG. 4 will be described below with the waveform shown in FIG. 7.

The input signal of the logic circuit 31 includes the driving signal gQ1 of the switches Q1 & Q4 and the driving signal gQ2 of the switches Q3 & Q2. After passing through the resistor Ra, the diode Da1 and the capacitor Ca, the falling edge of the driving signal gQ2 is delayed, and then becomes a signal u1. The signal u1 undergoes a logic AND operation with the driving signal gQ1 and then becomes a logic signal u2, which has a rising edge synchronized with the driving signal gQ1 and has a pulse width no more than that of the driving signal gQ1. After being amplified by the driving circuit 32, the logic signal u2 drives the switch Sa of the energy-recycling circuit 33. The switch Sa is firstly connected to the diode Da in series and then connected to the main power diode D1 in parallel for providing a uni-directional energy transmission which has a direction opposite to that of the diode D1. Therefore, the unit composed of the switch Sa, the diode Da and the diode D1 is able to achieve the bi-directional energy transmission. When the voltage u3 at the secondary side of the transformer T1 rises to be positive, the switch Sa is turned on. If there is an excess of energy transmitted to the output terminal when the converter is zero-loaded, the voltage of the output terminal will be higher than the voltage u3. A current will flow back from the output terminal to the primary side of the transformer T1 and the recycle of the energy will thus be achieved. When the load increases, the voltage u3 is higher than the voltage of the output terminal and a current flows from the diode D1 to the output terminal. Because of the diode Da, there is no current flowing through the switch Sa. Therefore, the energy-recycling circuit 33 has no influence on the operation of the main circuit with an increased load. The transistor Sa and the diode Da can also able to be adopted with the components of lower rating.

Figure 8:
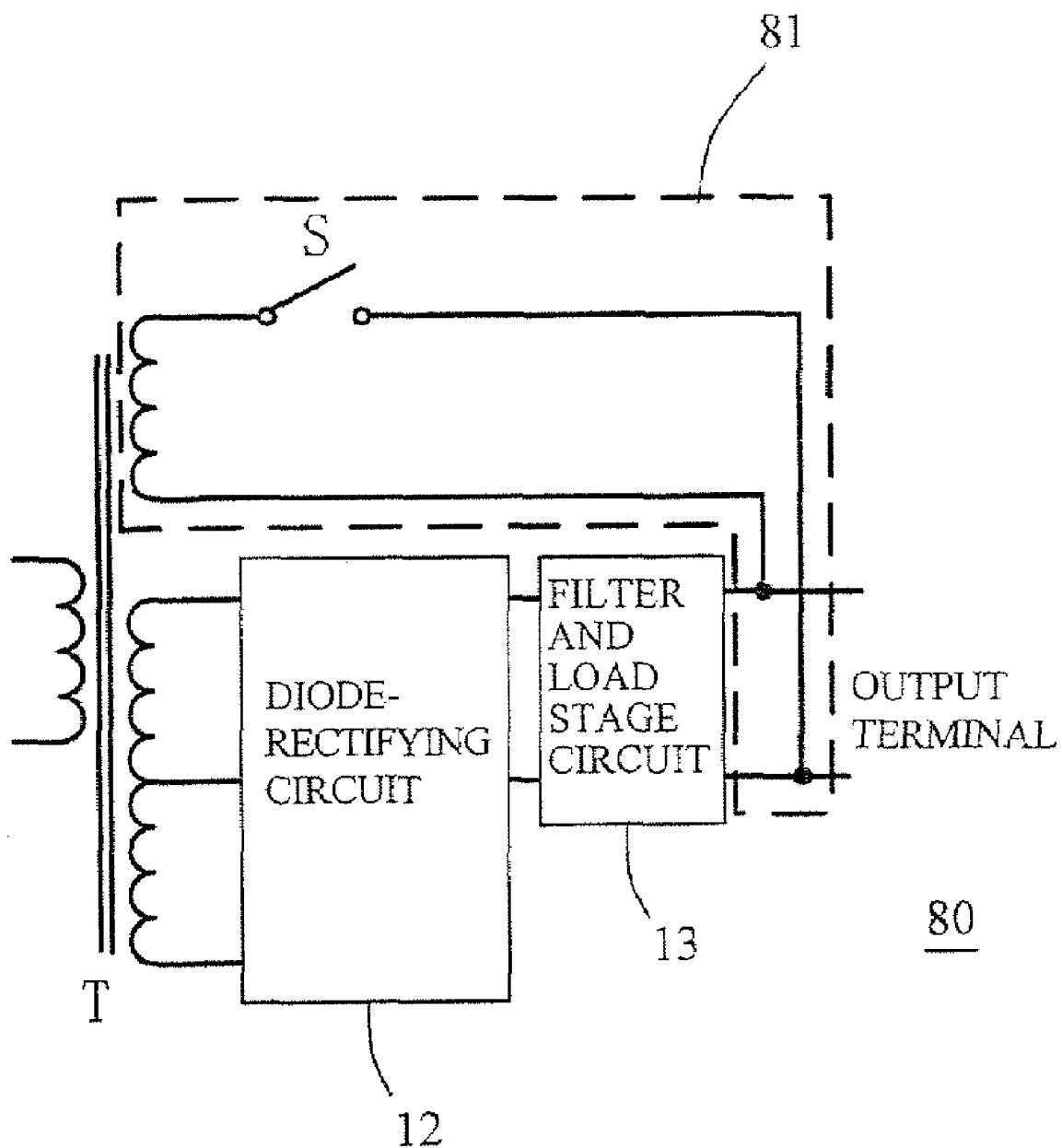
FIG. 8 is a circuit diagram showing another variation of the energy-recycling circuit according to the present invention.

Please refer to FIG. 8, which is a circuit diagram showing another variation of the energy-recycling circuit according to the present invention. Differing from the substantial circuits shown in FIG. 5, an inducting circuit is adopted in FIG. 8. That is, an auxiliary secondary winding and a switch S constitute the energy-recycling circuit 81 for controlling the energy to be recycled to the primary side. The energy-recycling circuit 81 is suitable for the converter with variable output-filtering circuit. If a capacitor is adopted to filter directly in the output, the circuit topology is equal to the circuit shown in FIG. 6(b). Besides, the switch S could be replaced with the respective circuits shown in FIG. 5(a)~(f), as long as the controllable energy channel from the output terminal to the input terminal can be formed. For the diode full-bridge rectifying circuit shown in FIG. 6(c), one switch element can be saved if the above circuit topology is adopted.

Figure 7:
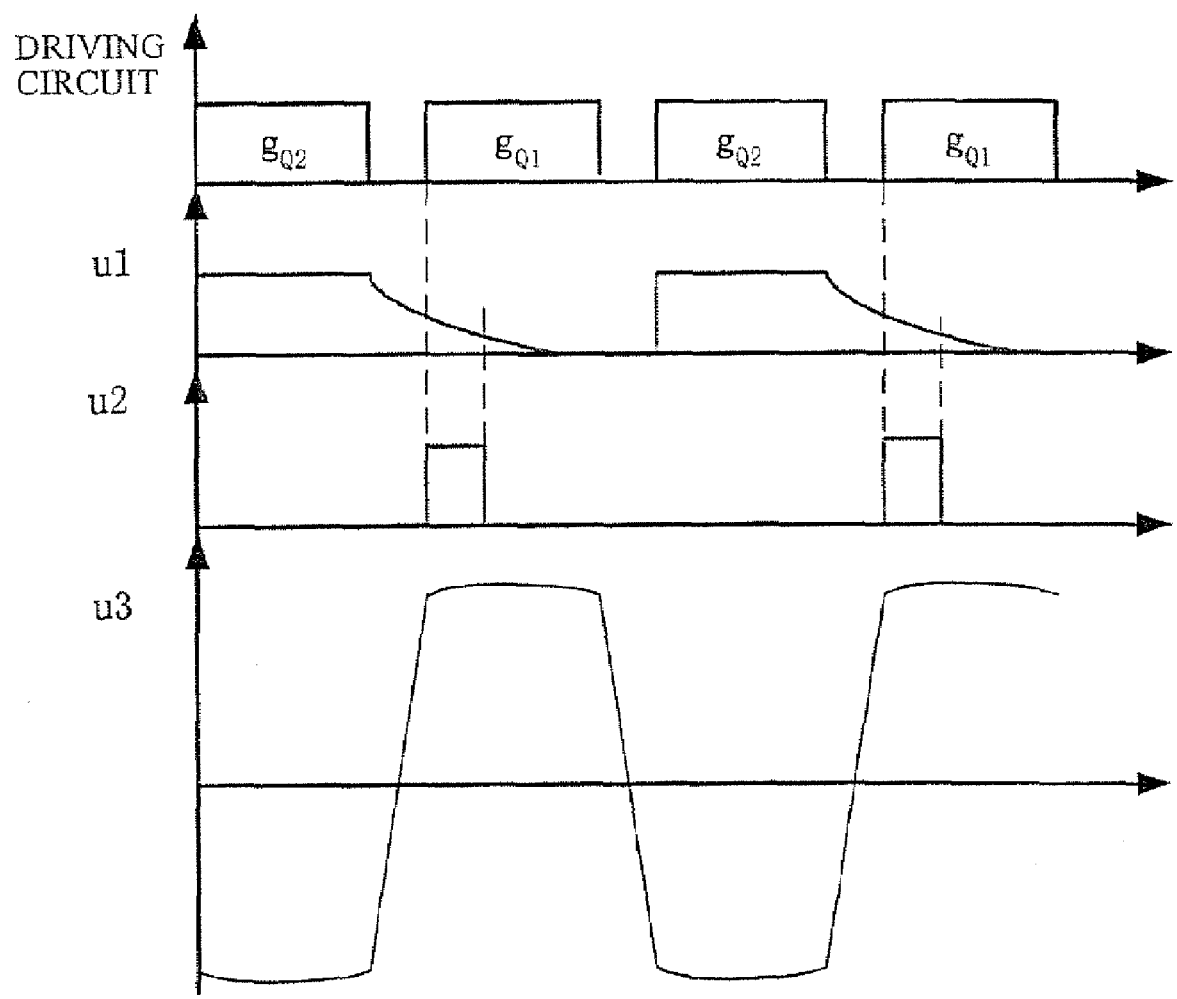
FIG. 7 is a waveform diagram showing the waveform of the resonant converter of FIG. 4.
Figure 9:
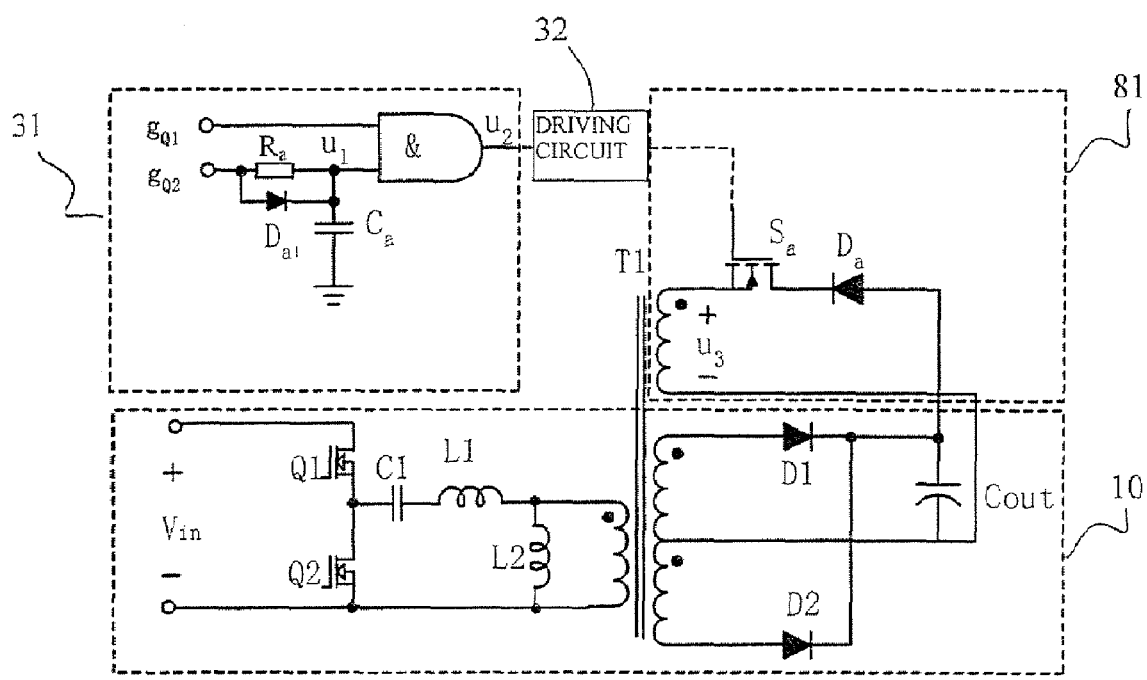
FIG. 9 is a circuit diagram showing a converter with the energy-recycling circuit of FIG. 8 according to another preferred embodiment of the present invention.

Please refer to FIG. 9, which is a circuit diagram showing a converter with the energy-recycling circuit of FIG. 8 according to another preferred embodiment of the present invention, and the waveform thereof is shown in FIG. 7.

In the converter 90, the blocks which are the same as those in FIGS. 3, 4 and 8 are marked with the same numerical symbols. The resonant converter 90 is a series resonant converter, which includes a dc/dc converter 10, a logic circuit 31, a driving circuit 32, and an energy-recycling circuit 81. Especially, the input-voltage generating circuit is a half-bridge circuit composed of two switches Q1 & Q2. The diode-rectifying stage circuit is a diode full-wave rectifying circuit. The energy-recycling circuit 81 is composed of an auxiliary secondary winding, a switch Sa and a diode Da.

The logic circuit 31 is completely the same with the logic circuit shown in FIG. 4. The logic circuit 31 finally generates a logic signal u2, which has a rising edge synchronized with the driving signal gQ1 and has a pulse width no more than that of the driving signal gQ1. Certainly, the control signal could also be generated by using normal synchronous rectification control method of flyback converter. When the voltage u3 at the secondary side of the transformer T1 rises to be positive, the switch Sa is turned on. If there is an excess of energy transmitted to the output terminal when the converter is zero-loaded, the voltage of the output terminal will be higher than the voltage u3. A current will flow back from the output terminal to the primary side of the transformer T1, thus the recycle of the energy and the stable operation is achieved. Similarly, when the load increases, the voltage u3 is higher than the voltage of the output terminal. Because of the diode Da, there is no current flowing through the switch Sa. Therefore, the energy-recycling circuit 81 has no influence on the operation of the main circuit with an increased load. The switch Sa and the diode Da can also able to be chosen with the components of low rating.

In conclusion, a resonant converter and a voltage stabilizing method thereof are provided in the present invention. To eliminate the drawback that the converter being operated unstably when being at light or zero load condition resulting from the parasitic parameters, an energy-recycling circuit is introduced to achieve the bi-directional transmission of energy. With this energy-recycling circuit, the excess of energy transmitted through the rectifying diode to the output terminal can be recycled to the input terminal. The stable operation of the system is thus achieved. The additional energy-recycling circuit has no influence on the operation of the main circuit. The switch and the diode can also able to be used with the components of low rating.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A resonant converter, comprising:
   an input terminal;
   an output terminal;
   a converting stage circuit electrically coupled to said input terminal to receive an energy from said input terminal;
   a diode-rectifying stage circuit electrically coupled to said converting stage circuit to rectify an output thereof;
   a filter and load stage circuit electrically coupled to said diode-rectifying stage circuit to generate an output on said output terminal;
   a logic circuit electrically coupled to said converting stage circuit to provide a logic signal;
   a driving circuit electrically coupled to said logic circuit to provide a driving signal in response to said logic signal; and
   an energy-recycling circuit electrically coupled to said converting stage circuit, said filter and load stage circuit and said driving circuit, for recycling said energy from said filter and load stage circuit to said input terminal in response to said driving signal when said filter and load stage circuit is operating at light load or no load condition.

2. The resonant converter as claimed in claim 1, wherein said diode-rectifying stage circuit is chosen from one of a diode half-wave rectifying circuit, a diode full-wave rectifying circuit and a diode full-bridge rectifying circuit.

3. The resonant converter as claimed in claim 1, wherein said energy-recycling circuit comprises at least a switch unit.

4. The resonant converter as claimed in claim 3, further comprising a complex unit comprising said switch unit and a diode of said diode-rectifying stage circuit coupled in parallel thereto, for recycling said energy from said filter and load stage circuit to said input terminal.

5. The resonant converter as claimed in claim 4, wherein said switch unit is chosen from one of a switch coupled in series to a resistor, a switch coupled in series to a diode, a switch, a switch coupled in series to a diode and a resistor, and a switch coupled in series to another switch.

6. The resonant converter as claimed in claim 3, wherein said energy-recycling circuit further comprises a transformer secondary auxiliary winding coupled in series to said switch unit.

7. The resonant converter as claimed in claim 6, wherein said switch unit is chosen from one of a switch coupled in series to a resistor, a switch coupled in series to a diode, a switch, a switch coupled in series to a diode and a resistor, and a switch coupled in series to another switch.

8. The resonant converter as claimed in claim 1, wherein said resonant converter is a series resonant converter.

9. The resonant converter as claimed in claim 8, wherein said converting stage circuit comprises an input-voltage generating circuit, a resonant circuit coupled to said input-voltage generating circuit, a transformer coupled to said resonant circuit, and a magnetizing inductor coupled in parallel to a primary side of said transformer.

10. The resonant converter as claimed in claim 9, wherein said input-voltage generating circuit is chosen from one of a half-bridge circuit and a full-bridge circuit and said resonant circuit comprises a resonant capacitor and a resonant inductor coupled in series thereto.

11. The resonant converter as claimed in claim 8, wherein said filter and load stage circuit comprises a capacitor.

12. The resonant converter as claimed in claim 8, wherein said logic circuit comprises a resistor, a diode, a capacitor and an AND logic gate.

13. A voltage stabilizing method for a resonant converter operating at light or no load condition, wherein said resonant converter comprises an input terminal, an output terminal, a converting stage circuit electrically coupled to said input terminal to receive an energy from said input terminal, a diode-rectifying stage circuit electrically coupled to said converting stage circuit to rectify an output thereof, and a filter and load stage circuit electrically coupled to said diode-rectifying stage circuit to~generate an output thereof on said output terminal, a logic circuit electrically coupled to said converter stage circuit, a driving circuit electrically coupled to said logic circuit, and an energy-recycling circuit electrically coupled to said converting stage circuit, said filter and load stage circuit and said driving circuit, the voltage stabilizing method comprising:
   Providing a logic signal from the logic circuit;
   Providing a driving signal from the driving circuit in response to said logic signal; and recycling said energy from said filter and load stage circuit to said input terminal when said resonant converter operates at light load or no load condition.

14. The voltage stabilizing method as claimed in claim 13, wherein said energy-recycling circuit comprises at least a substantial circuit between said converting stage circuit and said filter and load stage circuit for recycling said energy from said filter and load stage circuit to said input terminal.

15. The voltage stabilizing method as claimed in claim 13, wherein said resonant converter comprises a complex unit comprising said energy-recycling circuit and a diode of said diode-rectifying stage circuit coupled in parallel thereto, for recycling said energy from said filter and load stage circuit to said input terminal.

16. The voltage stabilizing method as claimed in claim 13, wherein said energy-recycling circuit comprises at least an inducting circuit between said converting stage circuit and said filter and load stage circuit for recycling said energy from said filter and load stage circuit to said input terminal.

* * * * *